US009177717B2

(12) United States Patent
Yang et al.

(10) Patent No.: US 9,177,717 B2
(45) Date of Patent: Nov. 3, 2015

(54) COIL TECHNIQUES

(75) Inventors: Songnan Yang, San Jose, CA (US);
Ulun Karacaoglu, San Diego, CA (US);
Emily B. Cooper, Portland, OR (US);
Bin Xiao, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/977,577

(22) PCT Filed: Sep. 15, 2011

(86) PCT No.: PCT/US2011/051777
§ 371 (c)(1),
(2), (4) Date: Jun. 28, 2013

(87) PCT Pub. No.: WO2013/039501
PCT Pub. Date: Mar. 21, 2013

(65) Prior Publication Data
US 2013/0271073 A1    Oct. 17, 2013

(51) Int. Cl.
*H01F 5/00*    (2006.01)
*H01F 38/14*   (2006.01)
*H01F 27/28*   (2006.01)
*H02J 7/02*    (2006.01)
*H04B 5/00*    (2006.01)

(52) U.S. Cl.
CPC .................. *H01F 38/14* (2013.01); *H01F 5/00* (2013.01); *H01F 27/28* (2013.01); *H02J 7/025* (2013.01); *H04B 5/0031* (2013.01); *H04B 5/0037* (2013.01)

(58) Field of Classification Search
CPC ........................ H01F 5/00; H01F 27/00–27/30
USPC ............. 336/65, 200, 232, 225–229; 257/531
See application file for complete search history.

(56) References Cited

U.S. PATENT DOCUMENTS

| 6,114,999 A * | 9/2000 | Cassel et al. .................. 343/702 |
| 2006/0151619 A1 | 7/2006 | Ninomiya et al. |
| 2011/0140671 A1 | 6/2011 | Kim et al. |

FOREIGN PATENT DOCUMENTS

| EP | 1956680 A1 | 8/2008 |
| JP | 06-065958 U | 9/1994 |

(Continued)

OTHER PUBLICATIONS

International Search Report and Written Opinion received for PCT Application No. PCT/US2011/051777, mailed on Apr. 12, 2012, 10 pages.

(Continued)

*Primary Examiner* — Tuyen Nguyen
(74) *Attorney, Agent, or Firm* — Sutherland Asbill & Brennan LLP

(57) ABSTRACT

Techniques are disclosed involving coils that may be used to exchange wireless energy between devices. For instance, a device may include a coil having a plurality of turns arranged along an arc. Further, the coil may have first and second ends that are substantially normal to the arc. The coil may be arranged within a casing of the device. This casing may have first and second non-parallel surfaces. In embodiments, the first end of the coil may be directed to (be substantially parallel with and proximate to) the first surface, while the second end of the coil may be directed to the substantially parallel with and proximate to) the second surface. The coil may be employed in wireless power transfer and/or near field communication applications.

27 Claims, 15 Drawing Sheets

(56) References Cited

FOREIGN PATENT DOCUMENTS

| | | |
|---|---|---|
| JP | 07-070451 | 3/1995 |
| JP | 09-238428 A | 9/1997 |
| JP | H10242742 A | 9/1998 |
| JP | 2002261524 A | 9/2002 |
| JP | 2005-209941 A | 8/2005 |
| JP | 2006314181 | 11/2006 |
| JP | 2009-064856 A | 3/2009 |
| JP | 2010075017 | 2/2010 |
| JP | 2011110168 | 9/2011 |
| KR | 10-0539013 B1 | 12/2005 |
| WO | 2008/109489 A2 | 9/2008 |
| WO | 2009/140221 A2 | 11/2009 |
| WO | 2010/036980 A1 | 4/2010 |
| WO | 2013/039501 A1 | 3/2013 |

OTHER PUBLICATIONS

Supplementary European Search Report for EP Application 11 87 2242 mailed Mar. 4, 2015. 8 pages.

Office Action for Japanese Application No. 2014-530640 mailed Feb. 3, 2015 (6 pages, including 2 pages of translation).

Office Action for JP Application No. 2014-530640 mailed Jul. 28, 2015 (6 pages, including 4 pages of translation).

* cited by examiner

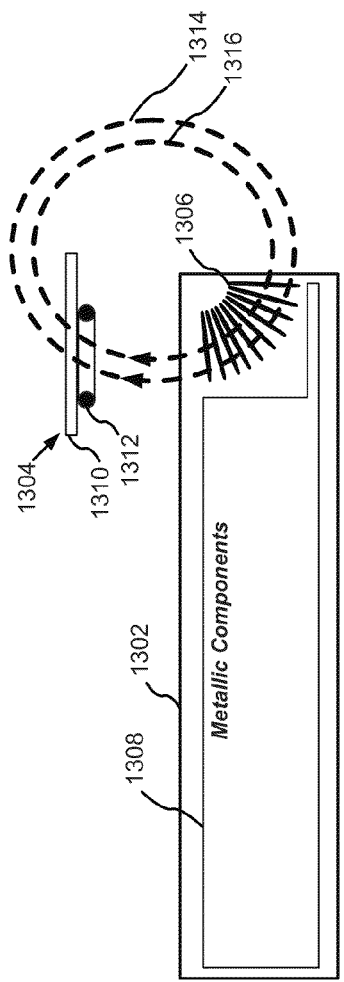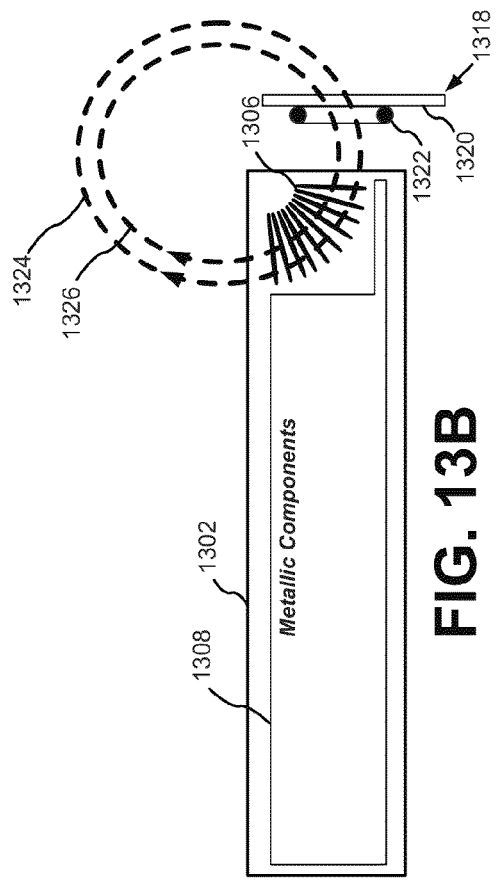
FIG. 13A
FIG. 13B

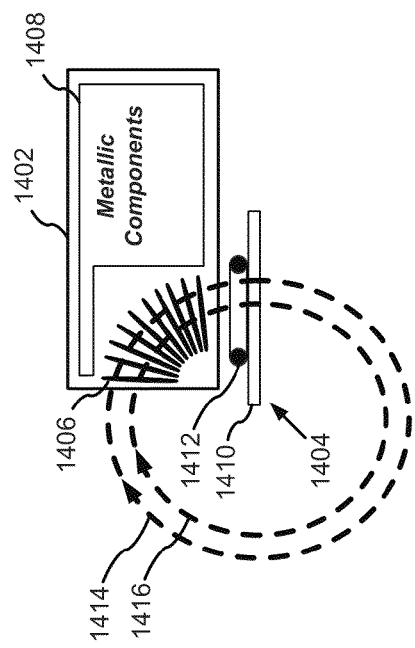
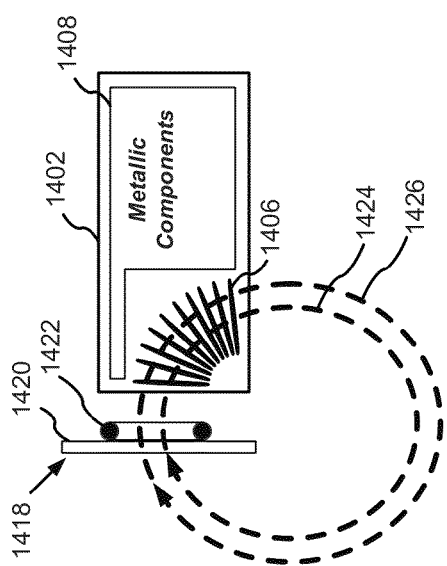

COIL TECHNIQUES

BACKGROUND

Devices within close proximity of each other may wirelessly transfer energy for various reasons. For instance, a device may wirelessly charge another device's battery. Also, a device may wirelessly provide another device with operational power. Such exchanges of energy are called wireless power transfer (WPT). Further, two devices may exchange wireless signals to engage in near field communications (NFC).

Such wireless energy transfer may involve an electromagnetic coupling between proximate coils. For example, a first device may have a transmitting coil and a second device may have a receiving coil. When an electrical current flows through the transmitting coil, a magnetic field is generated. In turn, this magnetic field may induce an electrical current in the receiving coil.

It is desirable for coil structures to efficiently transfer wireless energy. Further, it is desirable for such structures to be integrated into multiple host devices without significant modification or customization. Moreover, it is desirable for such structures to be resistant to noise and interference, as well as to provide energy transfer at various spatial directions.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein:

FIGS. 13A-B and 14A-B are views of NFC arrangements; and

DETAILED DESCRIPTION

Figure 1C:
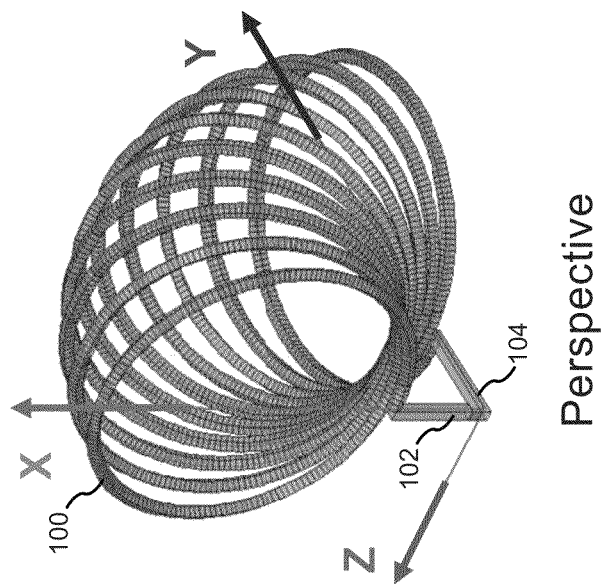
FIGS. 1A-1C are views of an exemplary coil.

Reference throughout this specification to "one embodiment" or "an embodiment" means that a particular feature, structure, or characteristic described in connection with the embodiment is included in at least one embodiment. Thus, appearances of the phrases "in one embodiment" or in "an embodiment" in various places throughout this specification are not necessarily all referring to the same embodiment. Furthermore, the particular features, structures, or characteristics may be combined in any suitable manner in one or more embodiments.

Embodiments provide techniques involving coils. Such coils may be used to exchange wireless energy between devices. For instance, a device may include a coil having a plurality of turns arranged along an arc. Further, the coil may have first and second ends that are substantially normal to the arc. The coil may be arranged within a casing of the device. This casing may have first and second non-parallel surfaces. In embodiments, the first end of the coil may be directed to (e.g., substantially parallel with and proximate to) the first surface, while the second end of the coil may be directed to (e.g., substantially parallel with and proximate to) the second surface.

Moreover, the device may include a module to exchange an electrical signal with the coil. For instance, the module may send the electrical signal to the coil. Alternatively or additionally, the module may receive the electrical signal from the coil. The electrical signal may be a WPT signal. Thus, the electrical signal may provide power (e.g., operational power or battery charging energy) to a remote device or to the device comprising the coil. In embodiments, the device may include a battery that is charged by the electrical signal. Alternatively or additionally, the signal may be a NFC signal. Such signals may convey information for various applications (e.g., user applications).

As described herein, the transfer of such energy may be in accordance with a wireless charging application. Such an application may be according to various wireless charging techniques, standards, and contexts. Examples include (but are not limited to) any versions or conventions of Wireless Resonant Energy Link (WREL) (WREL is developed by Intel Corporation of Santa Clara, Calif.), as well as wireless power techniques promulgated by the Consumer Electronics Association (CEA). Additionally or alternatively, the transfer of such energy may provide power to a receiving device for general use (e.g., operational power). Also, the transfer of such energy may be in accordance with a communications application, such as a near field communication (NFC) application.

These devices may be of various types. For example, the transmitting, and receiving devices may each be a computing platform. Exemplary computing platforms include notebook, laptop, and desktop computers. Further, exemplary computing platforms may include portable devices, such as tablets, wireless phones, smartphones, personal digital assistants (PDAs), media players, television devices, wearable computing devices, and so forth. Embodiments are not limited to these examples.

Through the techniques described herein, various advantages may be achieved. For instance, a receiving device may be placed further away from a transmitting device than would otherwise be possible at a given power transfer efficiency. Also, the techniques described herein may provide a device with multiple placement configurations for wireless coupling with other devices. In addition, the techniques described herein may provide noise mitigation without significant performance drawbacks. Further advantages will become apparent from the description provided herein.

Figure 1B:
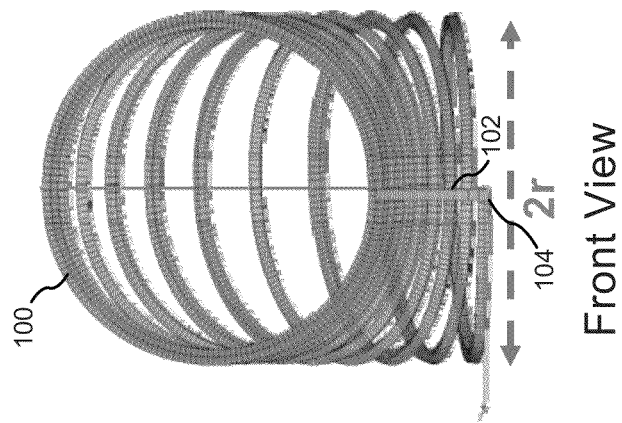
Figure 1A:
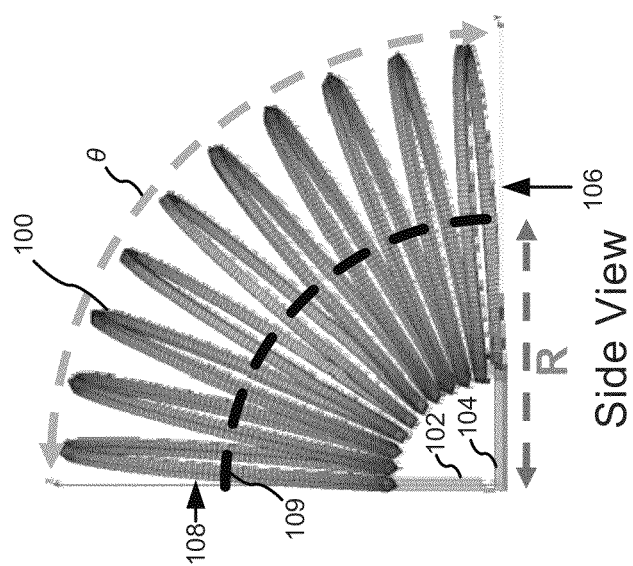

FIGS. 1A-1C are different views of an exemplary coil 100. In particular, FIG. 1A is a side view, FIG. 1B is a front view, and FIG. 1C is a perspective view.

Coil 100 includes multiple turns or windings. As shown in FIGS. 1A-1C, each of these turns is substantially circular. However, other shapes may be employed. Also, FIGS. 1A-1C show that each turn has a diameter 2r (and, thus a radius r).

Embodiments, however, are not limited to each turn having the same shape, radius, and/or size.

The turns of coil 100 span a partial torus. For purposes of illustration, FIGS. 1A-1C shows coil 100 spanning a quarter-torus. This partial torus has a radius, R. Thus, the turns of coil 100 are arranged along an arc 109 of radius R.

Coil 100 has two ends: a first end 106, and an opposite second end 108. As shown in FIGS. 1A-1C, ends 106 and 108 are aligned with arc 109. Thus, ends 106 and 108 provide substantially circular openings. These openings are substantially normal to arc 109.

The shape of coil 100 may be described by parametric equations (1) through (3), provided below.

$$X(t)=\sin(t/a)(R-r\cdot\cos(t)) \quad \text{(Equation 1)}$$

$$Y(t)=\cos(t/a)(R-r\cdot\cos(t)) \quad \text{(Equation 2)}$$

$$Z(t)=r\cdot\sin(t); \quad \text{(Equation 3)}$$

In Equations (1) through (3):

$$a = 2\cdot\pi\cdot\frac{\text{Total\_turns}}{\theta}; \text{ and}$$

$$0 \le t \le 2\cdot\pi\cdot\text{Total\_turns}$$

In Equations (1) through (3), r denotes the radius of each turn, and R denotes the radius of the partial torus. The parameter θ denotes an angle (in radians) of the partial torus arc that is covered by coil 100 (i.e., arc 109). "Total turns" refers to the number of turns used to establish θ. Thus, as an example, FIGS. 1A-1C show a coil design in which θ=π/2, and the total number of turns is 10.

Also, FIGS. 1A-1C show that coil 100 has an inner radius and an outer radius. The inner radius is determined by subtracting the turn radius from the partial torus' radius (i.e., R−r). The outer radius is determined by adding the turn radius to the partial torus' radius (i.e., R+r).

In embodiments, coils, such as coil 100 may be used in various applications. Examples include, but are not limited to, WPT and NFC applications. Such coils may operate as transmitting and/or receiving coils in the exchange of wireless energy. Accordingly, coil 100 includes terminals 102 and 104. In embodiments, these terminals may be coupled to elements (e.g., circuitry) that performs operations associated with such applications.

Figure 2A:
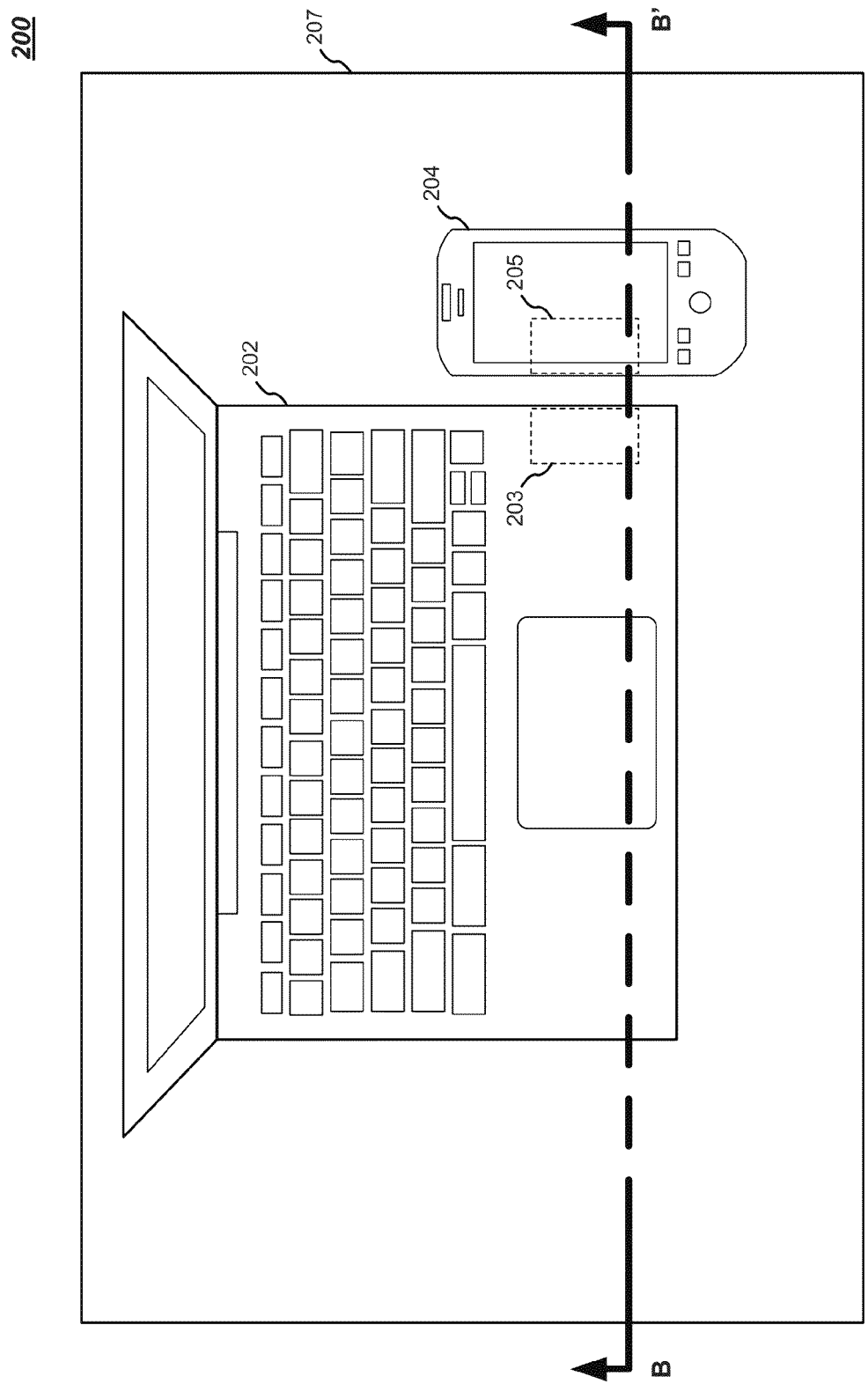
FIGS. 2A and 2B are views of an exemplary operational environment.
Figure 2B:
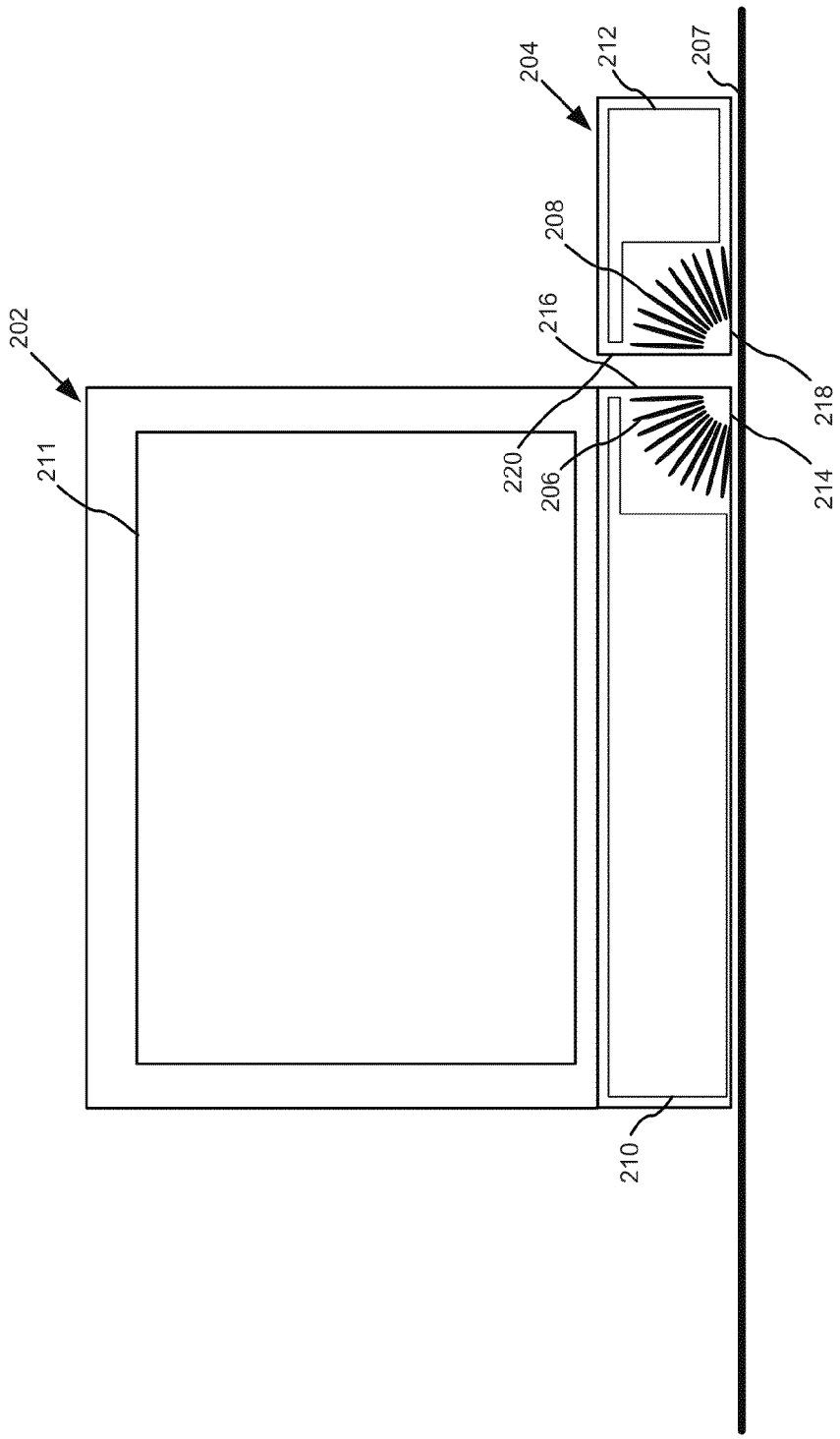

FIGS. 2A and 2B are views of an exemplary operational environment 200 in which the coil arrangement of FIGS. 1A-1C may be employed. Embodiments, however, are not limited to this particular coil arrangement. FIG. 2A provides an overhead view, and FIG. 2B provides a cross-sectional elevation view from the perspective of an axis B-B'.

As shown in FIGS. 2A and 2B, environment 200 includes a notebook computing device 202 and a smartphone device 204. These devices are provided for purposes of illustration, and not limitation. Thus, other device types may be employed in such an environment. FIGS. 2A and 2B show that devices 202 and 204 are placed on a surface 207 (e.g., a table surface, a desktop, etc.).

FIGS. 2A and 2B illustrate an exemplary placement of coils within devices 202 and 204 for the transfer of wireless energy (e.g., for WPT usage in which notebook computing device 202 transmits power to smartphone device 204). For instance, FIG. 2A shows spaces 203 and 205 existing within devices 202 and 204, respectively.

Corresponding coils are provided in spaces 203 and 205. In particular, FIG. 2B shows coil 206 within notebook computing device 202, and coil 208 within smartphone device 204. FIG. 2B shows coils 206 and 208 as each being implemented as coil 100 of FIGS. 1A-1C. However, embodiments are not limited to this coil implementation.

FIG. 2B shows that various components may be placed near coils 206 and 208. For instance, within notebook computing device 202, components may be within a space 210 that is near coil 206. Similarly, within smartphone device 204, components may be within a space 212 that is near coil 208. The components within spaces 210 and 212 may include (but are not limited to) various elements, such as electronic devices (e.g., circuitry), metallic objects (e.g., conductive lines, traces, wires, cables, printed circuit board ground planes, metallic connectors, electromagnetic interference protective coatings, etc.), and so forth.

Notebook computing device 202 and smartphone device 204 may employ coils 206 and 208, respectively, to wirelessly exchange energy through inductive coupling. For instance, in an exemplary arrangement, one of these coils may operate as a transmitting coil, while the other coil operates as a receiving coil. In this arrangement, an electrical current flows through the transmitting coil to produce a magnetic field. This magnetic field is received by the receiving coil. As a result, a corresponding electrical current is induced in the receiving coil. In embodiments, this induced current may deliver power to the receiving device (e.g., in the form of operational power and/or battery charging power). Alternatively or additionally, this induced current may convey information, for example, in the case of NFC applications.

In embodiments, coil 206 may operate as a transmitting coil, while coil 208 may operate as a receiving coil. Conversely, in thither embodiments, coil 208 may operate as a transmitting coil, while coil 206 may operate as a receiving coil. However, other arrangements may be employed. For instance, in yet further embodiments, each of coils 206 and/or 208 may be capable of operating as both transmitting and receiving coils (e.g., at different times).

FIG. 2B shows an exemplary orientation of coils 206 and 208. In particular, FIG. 2B shows that one end of coil 206 is facing downwards towards a first proximate surface 214 of notebook computing device 202 (and also to surface 207), while the other end of coil 206 is facing sideways towards a second proximate surface 216 of notebook computing device 202 (and also to an end of coil 208 within smartphone device 204).

Similarly, FIG. 2B shows that one end of coil 208 is facing downwards towards a first proximate surface 218 of smartphone device 204 (and also to surface 207), while the other end of coil 208 is facing sideways towards a second proximate surface 220 of Smartphone device 204 (and also to an end of coil 206 within notebook computing device 202).

Through this arrangement, current flowing along a transmitting coil (e.g., coil 206) generates a magnetic field that follows the transmitting coil's curvature. This magnetic field penetrates the receiving coil (e.g., coil 208) in a similar curvy fashion. As a result, a map, circuit is completed. In turn, the flux captured by the receiving coil induces a corresponding current in the receiving coil. An example of such features is illustrated in FIG. 3.

Figure 3:
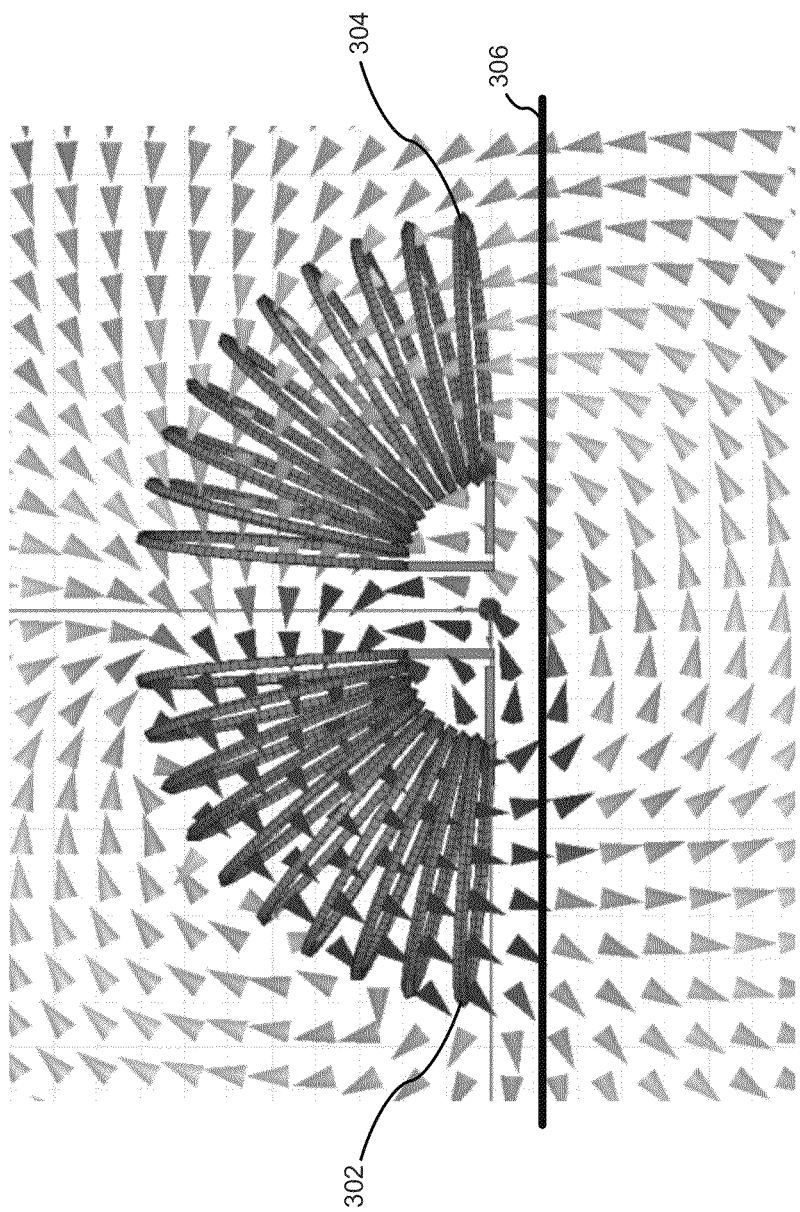
FIG. 3 is a diagram of an exemplary magnetic flux distribution.

FIG. 3 is a diagram showing an exemplary magnetic flux distribution when the coil implementation of FIGS. 1A-1C is employed. More particularly, FIG. 3 shows coils 302 and 304, which are arranged in the same manner as coils 206 and 208 of FIG. 2B. This magnetic flux distribution is generated by an electrical current flowing through coil 302. The strength and direction of the magnetic flux are indicated at multiple locations with triangle shaped "arrowheads". As shown in FIG. 3, magnetic flux penetrates a surface 306 (e.g., a non-conductive tabletop), which is beneath the coils. In the context of FIGS. 2A and 2B, this surface may be implemented as surface 207.

FIG. 3 shows that the coil implementation of FIGS. 1A-1C, as well as the arrangement of FIGS. 2A and 2B, may advantageously provide an integration-friendly arrangement that may achieve a very high coupling efficiency. This high coupling efficiency occurs by allowing more magnetic flux to be captured by the receiving coil. In turn, this may advantageously provide higher power transfer efficiencies for WPT applications and/or wider reading ranges for NFC applications.

FIGS. 1A-1C, 2A, 2B, and 3 are provided for purposes of illustration, and not limitation. Thus, other implementations and arrangements may be employed having one or more design parameter variations. Such variations may be selected to provide features, such as better manufacturability, device integration capability, and/or robust performance. Yet such variations may still provide the aforementioned high coupling performance.

As an example, various cross sectional shapes may be employed. Thus, embodiments are not limited to the circular cross sectional coil shape of FIGS. 1A-1C. This may advantageously allow for a coil to be fitted or accommodated within available space of a host device (e.g., a notebook computing platform, a wireless phone, a smartphone, a tablet computing platform, and so forth).

Figure 4B:
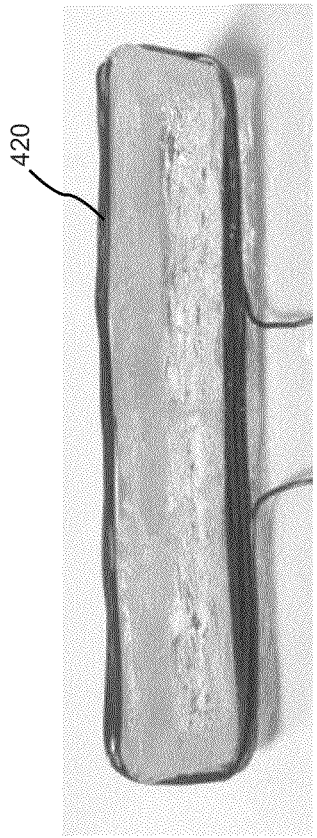
FIGS. 4A and 4B are views of exemplary coil shapes.
Figure 4A:
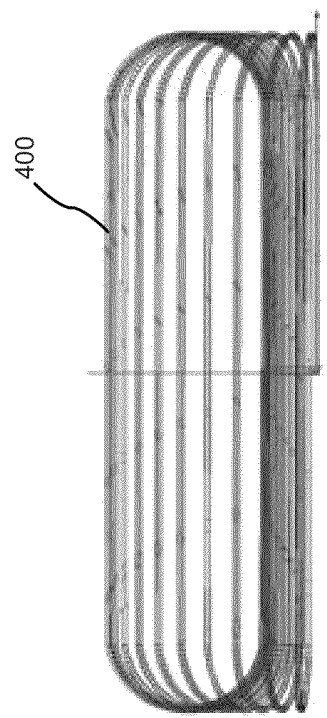

FIGS. 4A and 4B illustrate exemplary cross sectional shapes for coils. Embodiments, however, are not limited to these examples. For instance, FIG. 4A provides an example of a coil 400 having a "race-track" cross sectional shape. As shown in FIG. 4A, this race-track shape includes straight central portions between curved (e.g., semi-circular) ends. FIG. 4B provides an example of a coil 420 having a rectangular cross sectional shape. As a thither alternative, a coil may have a square cross sectional shape. Embodiments, however, are not limited to these examples. Such shapes may advantageously improve ease of manufacturing and/or integration into a host device.

As described above, coils may span a partial torus. For example, coil 100 of FIGS. 1A-1C spans a partial torus having an angle θ=π/2. However, embodiments may employ different partial torus angles. Thus, θ, as defined in Equation 1 is not required to be π/2. Instead, other values (greater or smaller) may be employed. Particular angle values may be chosen to provide a suitable fit within the chassis or casing of a host device (e.g., notebook computing platform, tablet computing platform, smartphone, etc.)

Figure 5B:
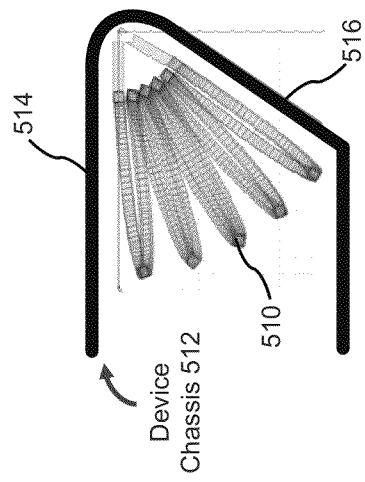
FIGS. 5A and 5B are diagrams of exemplary partial torus angles.
Figure 5A:
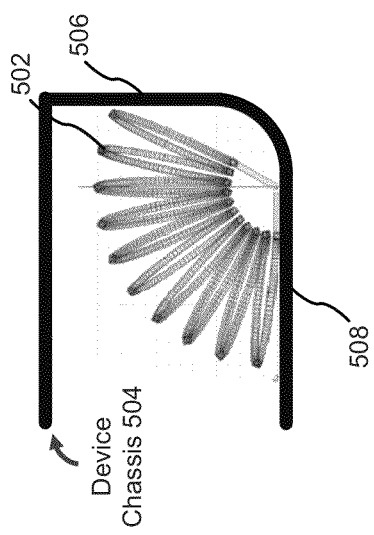

FIGS. 5A and 5B illustrate exemplary partial torus angles. For example, FIG. 5A shows a coil 502 employing a partial torus angle of 2π/3. Thus, the turns of coil 502 are arranged along an arc of angle 2π/3. This allows coil 502 to fit within a host device chassis (or casing) 504 having rounded off corners. More particularly, this angle allows for coil 502 to be advantageously placed nearer to surfaces 506 and 508 of chassis 504.

FIG. 5B shows a coil 510 employing a partial torus angle of π/3. Thus, the turns of coil 510 are arranged along an arc of angle π/3. This allows for coil 510 to fit within a host chassis (or casing) 512 having a tapered base. In other words, coil 510 may be advantageously placed nearer to surfaces 514 and 516 of chassis 512.

As described above, coils may have an inner radius. For instance, in the context of FIGS. 1A-1C, an inner radius of coil 100 is determined by subtracting the turn radius from the radius of the partial torus (i.e., R−r). Embodiments may provide a reduced inner radius. This may advantageously achieve a larger cross-section, as well as ease manufacturing complexity. For instance, in FIG. 5B, the inner portions of the turns are clustered together to advantageously increase cross sectional area for the given volume.

Figure 6:
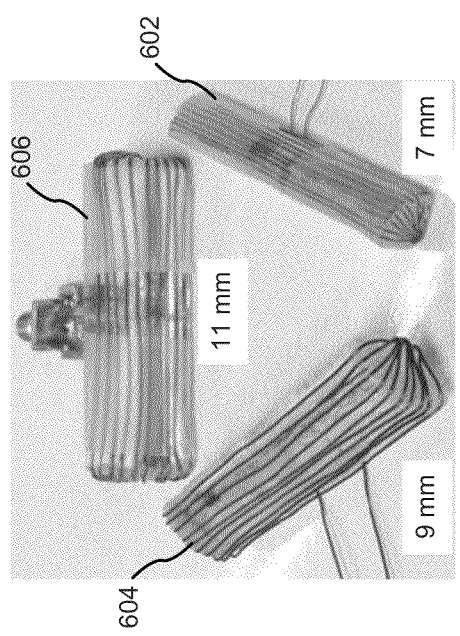
FIG. 6 illustrates exemplary coil implementations.

FIG. 6 illustrates exemplary coil implementations. In particular, FIG. 6 shows a coil 602 having an outer radius of 7 millimeters, a coil 604 having an outer radius of 9 millimeters, and a coil 606 having an outer radius of 11 millimeters. These coils can easily fit into existing ultra-thin notebook computing platforms, as well as some smartphones, without exceeding their thickness.

Figure 7:
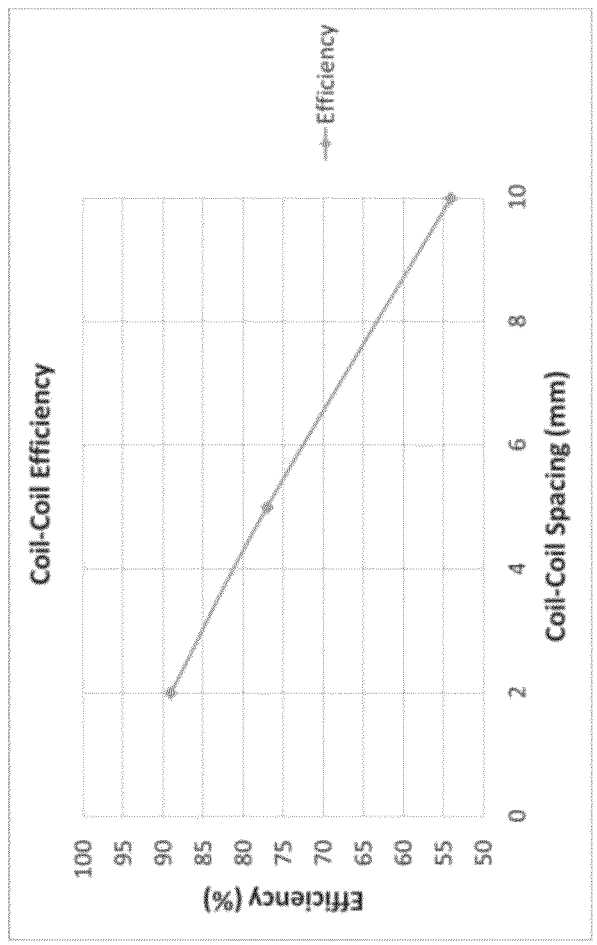
FIG. 7 is a graph showing coil efficiency characteristics.

FIG. 7 is a graph showing efficiency characteristics for coil 602 of FIG. 6. More particularly, these characteristics are for when two instances of coil 602 are employed in the arrangement of FIG. 3 (i.e., as coils 302 and 304). The graph of FIG. 7 shows that coil to coil efficiency reaches approximately 90% when the two coils are abutting each other, while still maintaining an efficiency of greater than 50% when the coils are separated by 1 centimeter.

In embodiments, coils may advantageously provide immunity to metallic components (e.g., conductive lines, traces, wires, cables, printed circuit board ground planes, metallic connectors, electromagnetic interference protective coatings, etc.) Such metallic components are often found in close proximity to coils within mobile devices.

Conventionally, a coil's performance is impacted by nearby metallic components through Eddy currents. Eddy currents are generated when a varying magnetic field is applied in a normal direction to a conductive surface. However, through the employment of a partial torus shape (e.g., a quarter torus shape), embodiments may provide coil structures that guide the magnetic field to bend around the center of the partial torus and bend away from potential metallic components within the chassis of a host device.

Figure 8B:
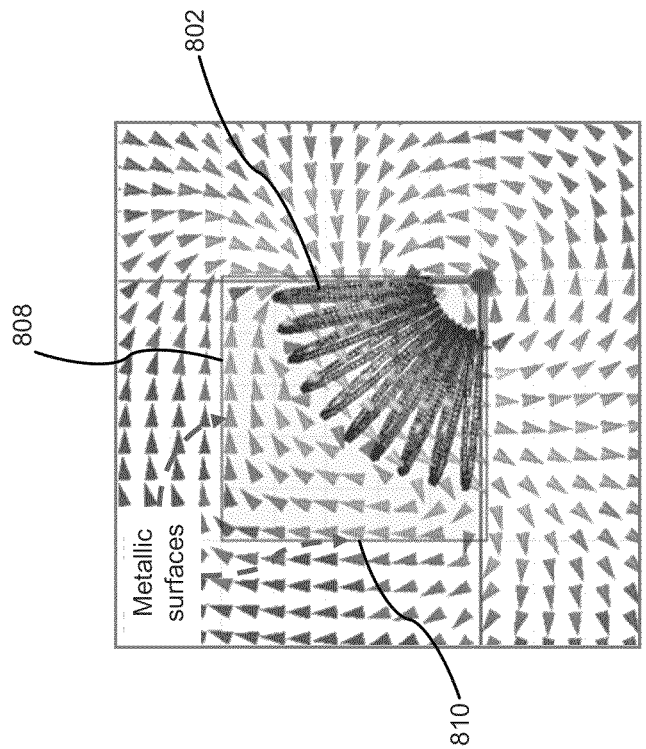
FIGS. 8A and 8B are diagrams of magnetic flux patterns.
Figure 8A:
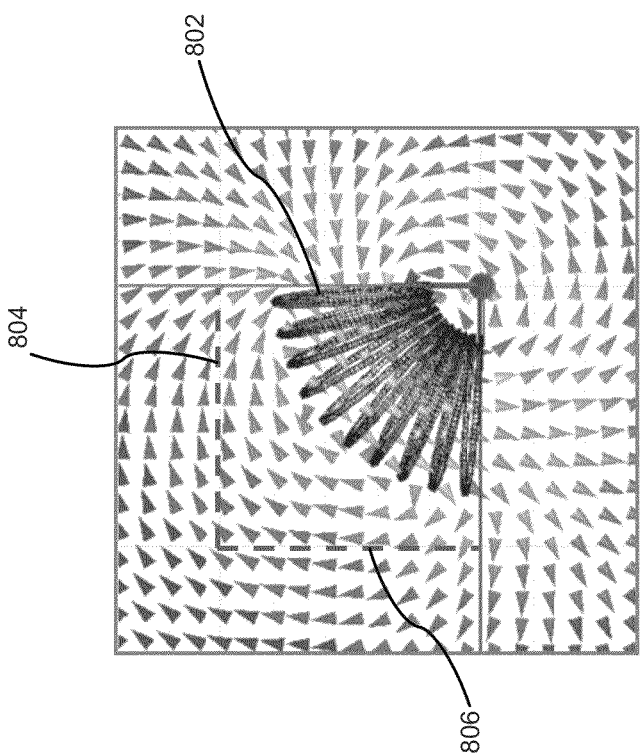

FIGS. 8A and 8B are diagrams of simulated magnetic flux distribution patterns that occur when an electrical current flows through a coil 802, which is implemented in accordance with FIGS. 1A-1C. In particular, FIG. 8A illustrates a magnetic flux distribution pattern when coil 802 is in free space. Two dashed lines 804 and 806 are shown in FIG. 8A to indicate likely positions of metallic objects that would be present in a host device.

It is worthy to mention that almost all of the generated magnetic flux along dashed lines 804 and 806 are in a primarily tangential direction to these lines. This indicates that there will be almost no induced Eddy currents if the metallic surfaces are placed in these positions near coil 802.

FIG. 8B is similar to FIG. 8A. However, FIG. 8B illustrates a magnetic flux distribution pattern when actual metallic surfaces are near coil 802. In particular, there are four metallic surfaces: a top surface 808 (shown in the location of line 804 in FIG. 8A), a left surface 810 (shown in the location of line 806 in FIG. 8A), a front surface parallel with the page (not shown), and a back surface parallel with the page (not shown). Despite the presence of these metallic surfaces, FIG. 8B shows no significant impact to the free space magnetic flux distribution of FIG. 8A.

As a result coil 802 may advantageously provide stable coil inductance and robust coil-to-coil coupling performance, regardless of nearby metallic components. Thus, such coil structures may be platform independent. Further, such coil structures may easily be scaled and integrated into a wide variety of mobile devices without customization. Detailed comparisons between embedded and conventional coils are provided in the following sections.

Figure 9B:
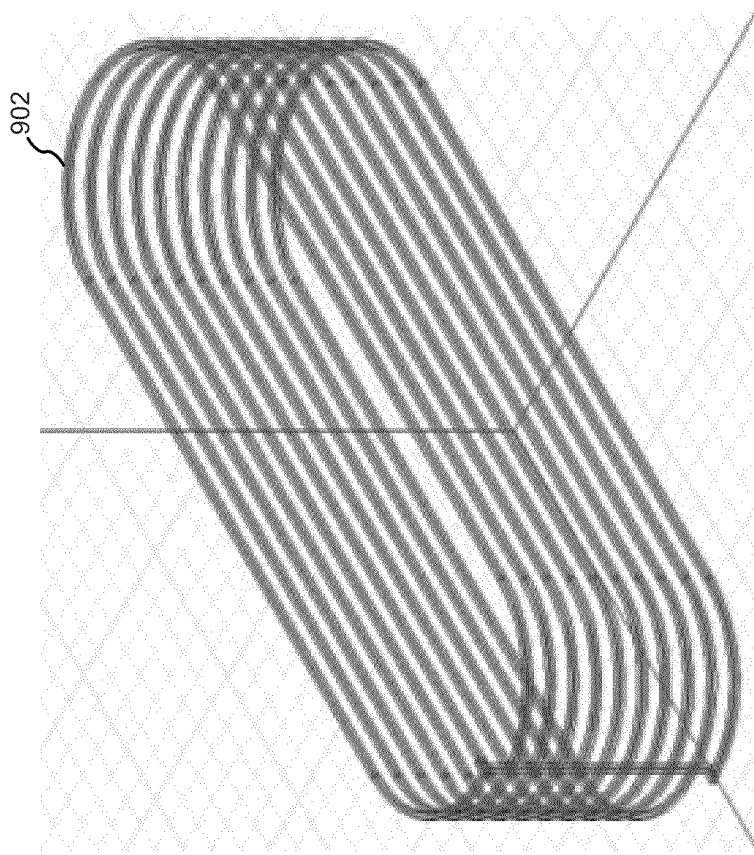
FIGS. 9A and 9B are side and perspective views of a conventional coil.
Figure 9A:
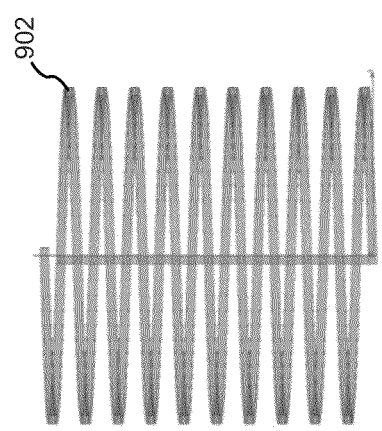

As described herein, embodiments provide coil structures having shapes that may provide various advantages over conventional coil shapes. For purposes of illustration, a conventional coil shape is shown in FIGS. 9A and 9B. More particularly, FIGS. 9A and 9B are side and perspective views of a conventional coil 902. Coil 902 has an elongated cylindrical shape. Thus, each turn of coil 902 has a "racetrack" shape. This shape is conventionally considered to be an effective solution for achieving high efficiency when devices are placed side-by-side. However, coils such as these are not easily integrated into multiple devices. This is because such coils have characteristics that are highly dependent on their surrounding components.

Figure 10B:
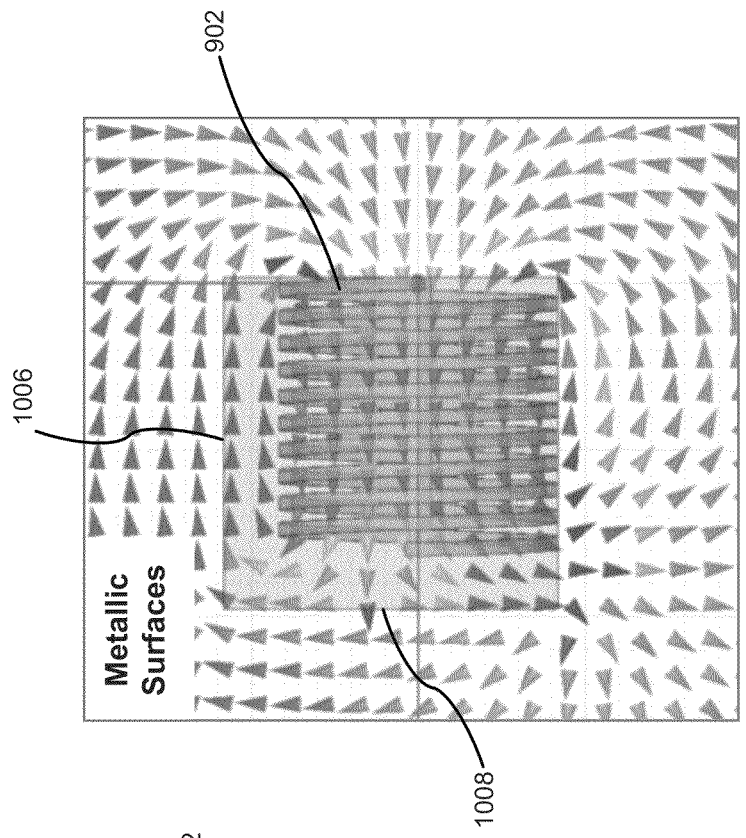
FIGS. 10A and 10B are diagrams of magnetic patterns.
Figure 10A:
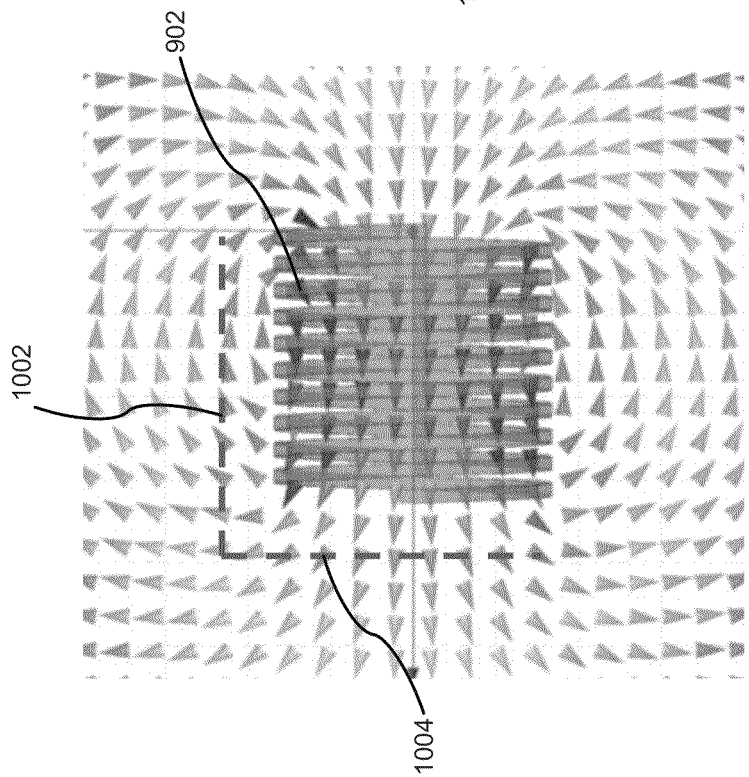

This dependence is demonstrated by FIGS. 10A and 10B, which are diagrams showing magnetic flux distributions when electrical current flows through coil 902. In particular, FIG. 10A shows a free space flux distribution when metallic surfaces are not near coil 902. In contrast, FIG. 10B shows a flux distribution when metallic surfaces are near coil 902.

FIG. 10A (similar to FIG. 8A) includes dashed lines 1002 and 1004. These dashed lines indicate likely positions of metallic objects that would be present along with coil 902 in a host device. As shown in FIG. 10A, the direction of magnetic flux generated by coil 902 is substantially perpendicular to dashed lines 1002 and 1004 (at the location of these lines).

FIG. 10B illustrates a magnetic flux distribution pattern when actual metallic surfaces are near coil 902. In particular, there are four metallic surfaces: a Lop surface 1006 (in the location of line 1002 in FIG. 10A), a left surface 1008 (in the location of line 1004 in FIG. 10A), a front surface parallel with the page (not shown), and a back surface parallel with the page (not shown). FIG. 10B also shows that (unlike in FIG. 10A) the direction of magnetic flux generated by coil 902 is substantially parallel to metallic surfaces 1006 and 1008 (at these surfaces). This difference indicates that Eddy currents are generated on these surfaces.

The significant differences between magnetic flux distributions of FIGS. 10A and 10B reflect a significant change in the characteristics of coil 902, especially the inductance of coil 902.

Table 1, below, provides characteristics of conventional coil 902 of FIGS. 9A and 9B, and of coil 400 of FIG. 4A. These characteristics are for both free space (such as in FIGS. 8A and 10A) and integrated conditions (i.e., integrated into a host device with nearby metallic objects, such as in FIGS. 8B and 10B).

As shown in Table 1, the inductance variation for coil 902 between free space and integrated conditions is almost 30%. In contrast, quarter tows coil 400 of FIG. 4A only exhibits a 1.7% inductance variation between such free space and integrated conditions. This smaller inductance variation is attributed to the flux bending capability provided by the partial torus structure of coil 100.

Table 1 also indicates capacitance values that are needed to tune coils 400 and 902 to resonance at a frequency of 13.56 megahertz. Such capacitance values are provided for both free space and integrated environments. It is worthy to note that this resonant frequency is chosen for purposes of illustration, and not limitation. Thus, other resonant frequencies and/or tunings may be employed.

In particular, Table 1 indicates that, for coil 902, 13.6 picofarads (pF) of additional capacitance is needed for tuning to this resonance frequency when it is integrated in a host device. In contrast, for coil 400, only 0.7 pF of additional capacitance is needed for tuning to this resonance frequency when it is integrated into a host device. Thus, for coil 400, fixed tuning capacitor(s) may advantageously be used for the integration into host devices. In other words, no extra customization tuning would be required after integration into a host device.

TABLE 1

| Coil Comparison | Free Space L (nH) | Free Space Tuning C (pF) | Integrated L (nH) | Integrated Tuning C (pF) | Variation in L (%) | Required Variation in C (pF) |
| --- | --- | --- | --- | --- | --- | --- |
| Straight Racetrack Coil (FIGS. 9A-9B) | 2968 | 46.4 | 2297 | 60 | 29.2 | 13.6 |
| Quarter Torus Coil (FIG. 4A) | 2824 | 48.8 | 2777 | 49.6 | 1.7 | 0.8 |

Figure 11B:
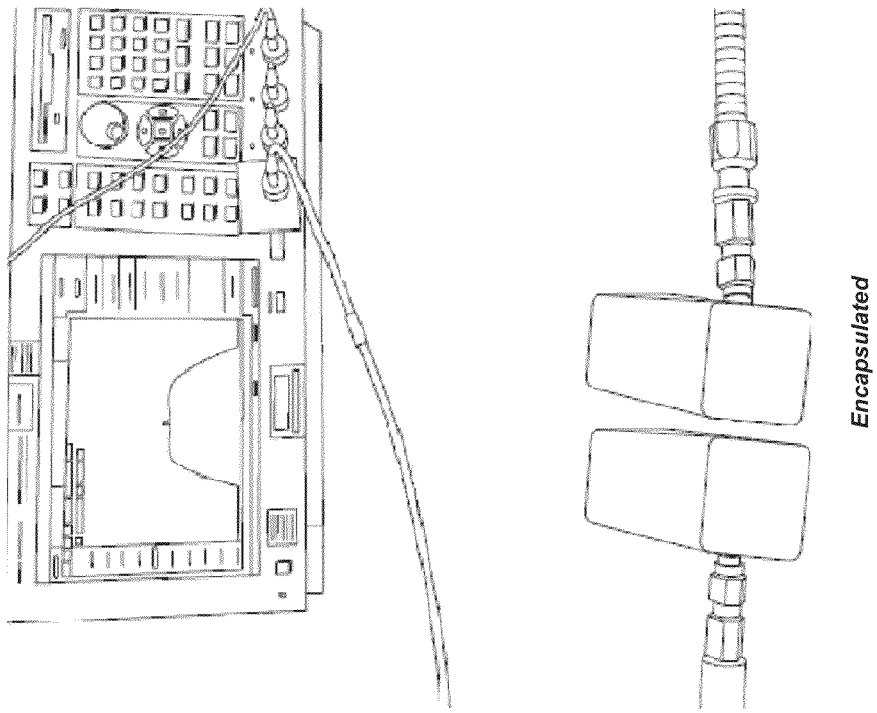
FIGS. 11A and 11B illustrate side-by-side coil arrangements.
Figure 11A:
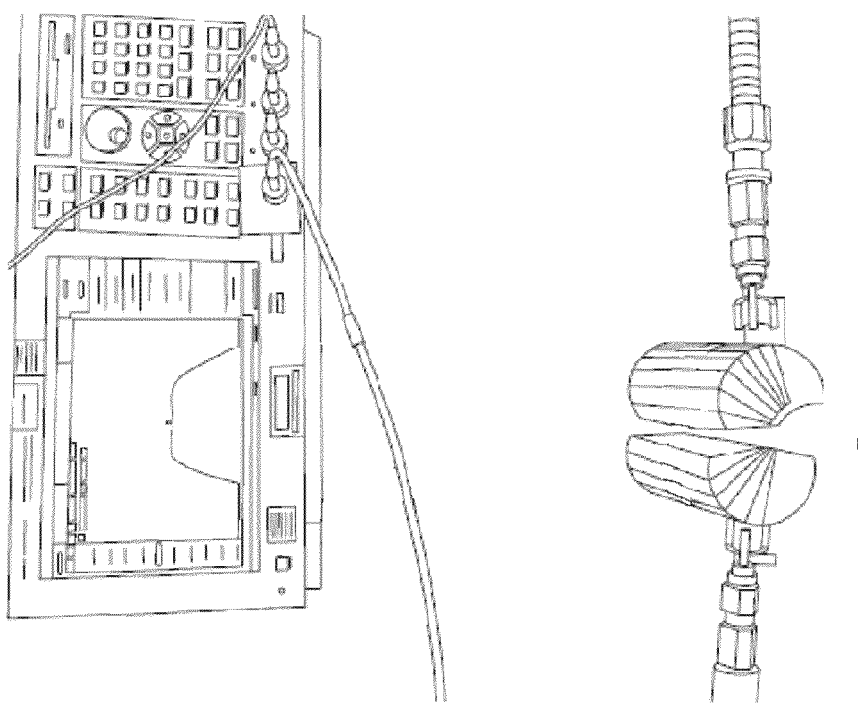

FIGS. 11A and 11B provide a comparison between side-by-side arrangements of coils that each employ a quarter torus shape. More particularly, FIG. 11A shows two coils in a side-by-side arrangement with no nearby external metallic objects. In contrast, FIG. 11B shows two coils in a side by side arrangement, where each of the coils is encapsulated in a metallic housing. This metallic housing has four faces. More particular, for each coil, all of its sides are covered, except for the side facing the other coil and the bottom side. Thus, each of the coils in FIGS. 11A and 11B are similar to each of the coils in FIGS. 10A and 10B, respectively.

The arrangement of FIG. 11A achieves a high coil-to-coil coupling efficiency that is greater than 85% (S21>−0.7 dB). The arrangement of FIG. 11B achieves substantially the same results. In other words, there is almost no change to power transfer efficiency after adding the metallic housing. This thither illustrates the robustness of partial torus coil shapes towards nearby metallic components. Thus, such coils may be advantageously scalable to (and easily integrated with all mobile computing devices.

As described herein, embodiments may include coil structures having shapes, such as partial torus shapes. These coil structures may advantageously provide flux guiding capabilities. With such flux guiding capabilities, these coil structures may eliminate the need for ferrite materials. This feature may advantageously allow for significant cost savings over conventional approaches (especially in the context of NFC systems). Details regarding such savings are provided below.

Conventional antenna designs for NFC applications typically include planar coils printed on rigid or flexible printed circuit boards (PCBs). Such implementations present significant challenges when the coils need to be placed above (or attached to) a metallic surface (such as a chassis of an electronic device).

Figure 12C:
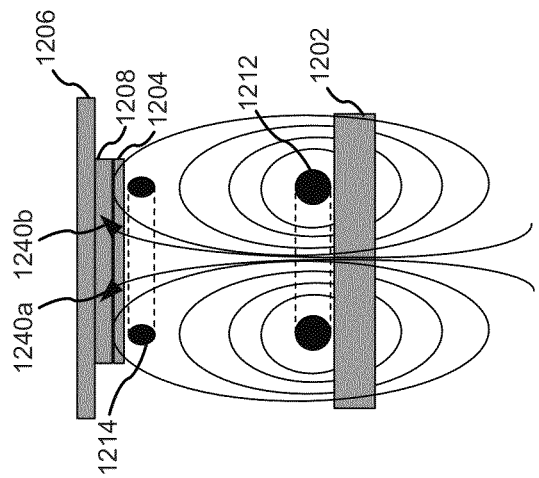
FIGS. 12A-12C are cross-sectional views of coil implementations that may be employed in applications involving near field communications.
Figure 12B:
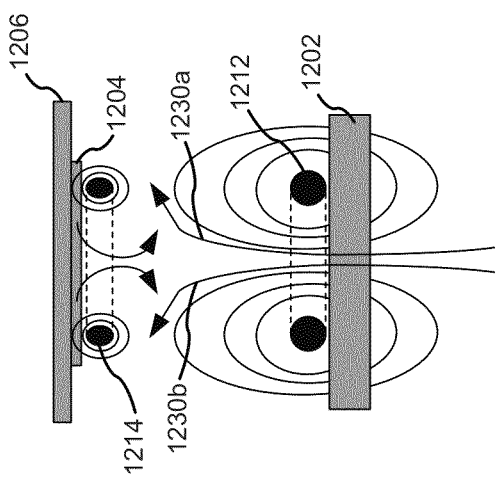
Figure 12A:
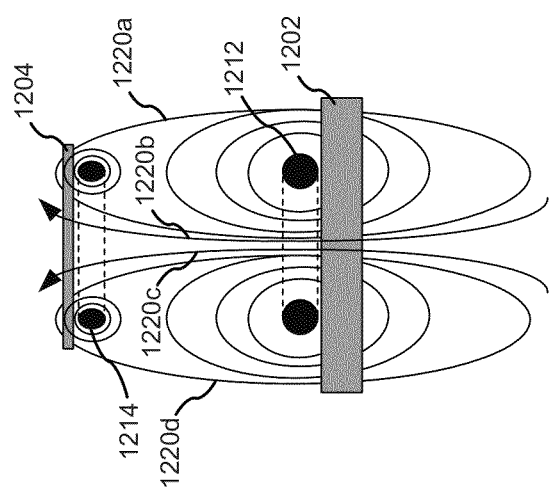

FIGS. 12A-12C are cross sectional views of implementations that may be employed in NFC applications. Each of these implementations includes a reader or writer 1202, and a card or tag 1204. Moreover, in each of FIGS. 12A-12C, a coil 1212 is associated with reader/writer 1202. Similarly, in FIGS. 12A-12C, a coil 1214 is associated with card/tag 1204. Reader/writer 1202 and card/tag 1204 may each be implemented in any combination of hardware and/or software. For instance, each of reader/writer 1202 and/or card/tag 1204 may include an integrated circuit (IC). More particularly, each of reader/writer 1202 and/or card/tag 1204 may be implemented with a planar printed circuit board (PCB).

In general operation, reader/writer 1202 generates a signal in the form of an electrical current that is circulated through coil 1212. This electrical current generates a magnetic field.

To communicate with card/tag 1204, flux corresponding to this magnetic field must penetrate coil 1214 (which corresponds to card/tag 1204).

Differences exist among the implementations FIGS. 12A-12C. For instance, in FIG. 12A, reader/writer 1202 and card/tag 1204 are arranged in free space. In this implementation, FIG. 12A shows that flux (indicated by 1220a-1220d) penetrates coil 1214. Thus, communications can occur between reader/Writer 1202 and card/tag 1204.

In contrast, FIG. 12B shows an implementation in which a metallic surface 1206 is adjacent to tag 1204. As a result, an Eddy current occurs on metallic surface 1206. This prevents flux generated by reader/writer 1202 (shown, for example, as 1230a and 1230b) from penetrating coil 1214. Hence, card/tag 1204 cannot receive information transmitted by reader/writer 1202.

A conventional approach for overcoming the Eddy current problem of FIG. 12B involves the employment of a relatively expensive magnetic material sheet (e.g., ferrite). For example, FIG. 12C shows a ferrite layer 1208 between card/tag 1204 and metallic surface 1206. The employment of ferrite concentrates the magnetic flux inside the ferrite layer to reduce the Eddy current. This ferrite layer also helps to maintain a somewhat stable coil inductance for different surfaces to which the reader/tag, may be applied. However, ferrite also unfortunately introduces magnetic losses to magnetic fields travelling through it. Despite this, FIG. 12C shows flux (indicated by 1240a and 1240b) penetrating coil 1214.

Embodiments may advantageously overcome these disadvantages. For instance, the use of costly and lossy ferrite materials may be eliminated. FIGS. 13A-B and 14A-B show arrangements in which devices having partial torus coil structures may wirelessly communicate with NFC tags. These devices may be of various types. For example, these devices may be computing platforms. As described above, exemplary computing platforms include notebook, laptop, and desktop computers. Further exemplary computing platforms may include portable devices, such as tablets, wireless phones, smartphones, personal digital assistants (PDAs), media players, television devices, wearable computing devices, and so forth. Embodiments are not limited to these examples.

For instance, FIG. 13A is a side view of an arrangement in which a coil-embedded device 1302 wirelessly communicates with an NFC tag 1304. As shown in FIG. 13A, device 1302 includes a coil 1306 having a partial torus shape (e.g., implemented as described with respect to FIGS. 1A-1C). Coil 1306 is placed along the edge of the chassis of device 1302 (against the top and right side edges of device 1302). Also, device 1302 includes metallic components 1308. As described above, in this arrangement, coil 1306 is immune from effects caused by the presence of nearby metallic components 1308. Thus, device 1302 does not need or include ferrite material.

FIG. 13A shows that NFC tag 1304 is positioned above device 1302. Tag 1304 includes a substrate 1310 and a planar coil 1312. FIG. 13A shows exemplary flux from coil 1306 (indicated by 1314 and 1316) penetrating coil 1312.

FIG. 13B is a side view of an arrangement that is similar to the arrangement of FIG. 13A. However, in FIG. 13B, device 1302 communicates with an NFC tag 1318, which is placed beside device 1302. Like NFC tag 1304, NFC tag 1318 also includes a substrate 1320 and a planar coil 1322. FIG. 13B shows exemplary flux from coil 1306 of device 1302 (indicated by 1324 and 1326) penetrating coil 1322.

FIGS. 14A and 14B are side views of arrangements involving a device that employs a different coil orientation. For instance, FIG. 14A shows a device 1402 that communicates with an NFC tag 1404. Device 1402 includes a coil 1406 having a partial torus shape (e.g., as described with respect to FIGS. 1A-1C). Coil 1406 is placed along the edge of the chassis of device 1402 (against the bottom and left side edges of device 1402). Also, device 1402 includes metallic components 1408. As described above, in this arrangement, coil 1406 is immune from effects caused by the presence of nearby metallic components 1408. Thus, device 1402 does not need or include ferrite material.

FIG. 14A shows that NFC tag 1404 is positioned beneath device 1402. For example, tag 1404 may be embedded in a surface, such as a table top. Tag 1404 includes a substrate 1410 and a planar coil 1412. FIG. 14A shows exemplary flux from coil 1406 (indicated by 1414 and 1416) penetrating coil 1412.

FIG. 14B shows an arrangement that is similar to the arrangement of FIG. 14A. However, in FIG. 14B, device 1402 communicates with an NFC tag 1418 that is positioned beside device 1402. Like NFC tag 1404, NFC tag 1418 also includes a substrate 1420 and a planar coil 1422. FIG. 14B shows exemplary flux from coil 1406 of device 1402 (indicated by 1424 and 1426) penetrating coil 1422.

As illustrated in FIGS. 13A-B and 14A-B, the coil structures described herein may be very useful. For example, mobile devices (e.g., wireless telephones, smart phones, tablet computing devices, notebook computing devices, etc.) may have substantially all of their entire top and bottom surfaces metallic (except for portions of these surfaces that are aligned with the ends of their corresponding coils).

In contrast, the devices that employ planar coils (e.g., as described above with references to FIGS. 12A-C) are significantly impaired by such metallic surfaces. Although the inclusion of ferrite may partially overcome such impairments, ferrite material is expensive, and still causes some performance degradation.

Moreover, unlike conventional coils, the coil structures described herein advantageously support more than one operating configuration. For instance, the arrangements of FIGS. 13A and 13B provide for effective communications with NFC tags placed (at least) above and beside device 1302.

Similarly, the arrangements of FIGS. 14A and 14B allow for effective communications with NFC tags placed (at least) beside and below device 1402. Thus, both side-by-side and top-down configurations may be supported at the same time. This feature allows the devices embedded with such coils to have better compatibility (able to work with a variety of different devices in multiple configurations). This, in turn, offers richer user experiences.

In contrast, conventional coil structures for WPT and NFC applications typically support only one operating configuration. For example, the straight race-track coils shown in FIGS. 9A and 9B achieve high efficiency only when placed in a side-by-side configuration. Likewise, the planar coils shown in FIGS. 12A-C achieve highest coupling only when one coil is placed right above the other coil.

Embodiments may advantageously mitigate platform noise interference. Conventionally, this interference is a problem that hinders the integration of NEC features into mobile computing devices. With conventional coil structures, a coil integrated inside a device's chassis can pick up platform noise (e.g., clock, signal harmonics, and high speed bus signals, circuitry noise, and so forth). Unfortunately, as described above with reference to FIGS. 12A-12C, conventional NFC coil structures (e.g., planar coils) exhibit substantial performance degradation when nearby shielding material is employed to prevent such platform noise interference.

However, in embodiments, shielding material may encapsulate coil structures. An example of this is shown in FIG. 8B. As described above, nearby metal has little impact to the performance of such coils. Thus, such coils can be shielded from platform noise while still exhibiting desirable performance. In turn, this may offer improved reading range and robustness for embedded NFC communications.

As described herein, coil structures, such as those described herein may be included in devices to perform various applications involving the transfer of wireless energy. Such applications may include (but are not limited to) WPT and NFC applications. In such devices, coil structures may be coupled to elements (e.g., circuitry) included in such devices. Such circuitry is associated with application(s) involving the transfer of wireless energy. Details regarding examples of such elements are described with reference to FIG. 15.

Figure 15:
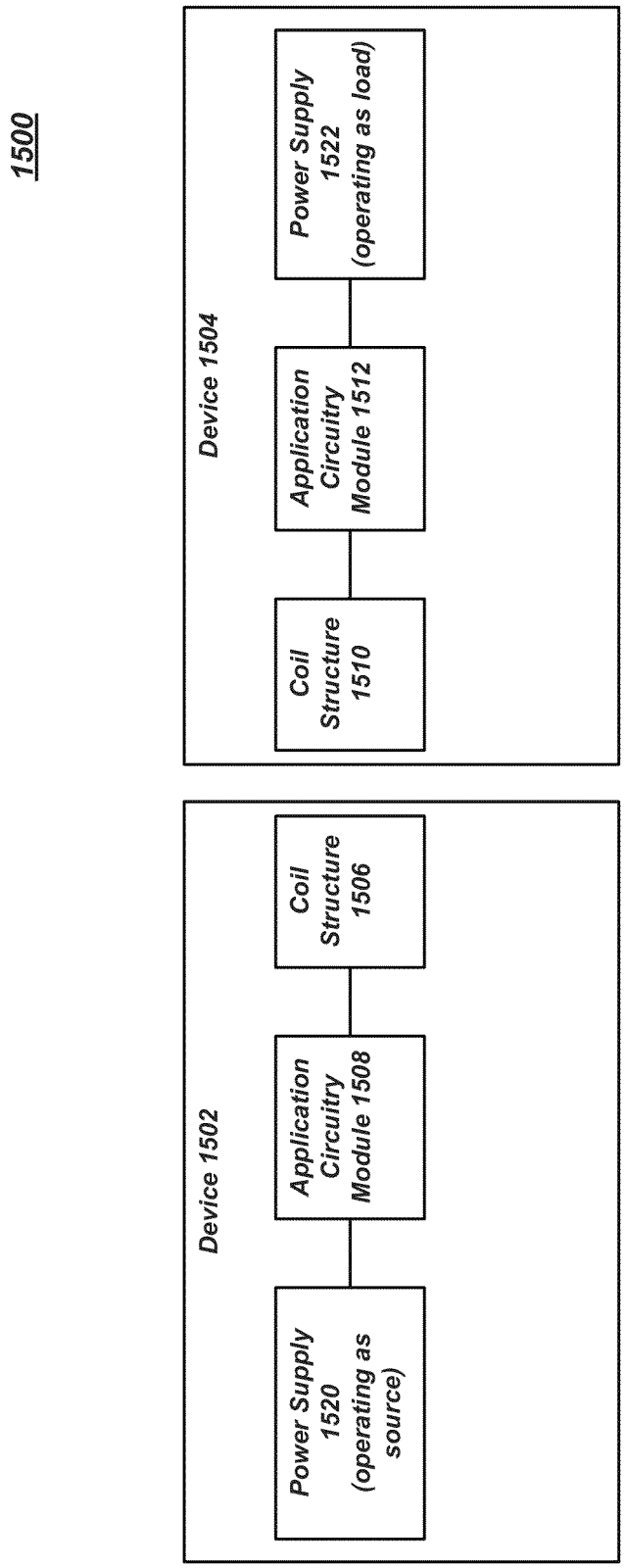
FIG. 15 is a diagram of an exemplary operational environment.

In particular, FIG. 15 is a diagram of an exemplary operational environment 1500 in which the techniques described herein may be employed. This environment includes a first device 1502 and a second device 1504. These devices include various elements that may be implemented in any combination of hardware and/or software.

As shown in FIG. 15, each of devices 1502 and 1504 includes a coil structure and an application circuitry module. More particularly, device 1502 includes a coil structure 1506 and an application circuitry module 1508, while device 1502 includes a coil structure 1510 and an application circuitry module 1512. Through these elements, devices 1502 and 1504 exchange wireless energy in accordance with one or more applications (e.g., wireless charging, power transfer, and/or NFC applications).

In embodiments, one of coil structures 1506 and 1510 operates as a transmitting coil while the other operates as a receiving coil. Also, the transmitting coil and/or the receiving coil may be implemented in accordance with the techniques described herein. For instance, one or both of these coil structures may have partial torus shapes. Moreover, one or both of these coil structures may be implemented in the arrangements and/or relative positions described herein.

Application circuitry modules 1508 and 1512 generate, receive, and/or process signals corresponding to energy transferred between coil structures 1506 and 1510.

Also, FIG. 15 shows that devices 1502 and 1504 may include power supplies 1520 and 1522, respectively. Such power supplies may include various elements. Examples of such elements include power supplies that deliver operational power based on an alternating current (AC) power source. Alternatively or additionally, such elements may include a battery that is rechargeable. Power supplies 1520 and 1522 may deliver operational power to their respective devices. Additionally or alternatively, power supplies 1520 and 1522 may deliver power to other devices through the wireless transfer of energy.

Accordingly, in such cases, a local device's power supply may operate as a source, while a remote device's power supply may operate as a load. This may occur, for instance, in the charging of a remote device's battery, and/or in the delivery of operational power to a remote device's power supply.

For purposes of illustration (and not limitation), FIG. 15 shows a scenario in which device 1502 is wirelessly delivering power to device 1504 through coil structures 1506 and 1510. Accordingly, FIG. 15 indicates that power supply 1520 is operating as a source, while power supply 1522 is operating as a load. This example is provided as an example. Thus, additionally or alternatively, power supply 1522 may operate as a source and power supply 1520 may operate as a load.

Further, as described herein, wireless exchanges may occur through coil structures 1506 and 1510 for applications that do not involve operational or charging power. Such exchanges may include the exchange of information (e.g., NFC communications).

Also, although not shown, devices 1502 and 1504 may each include processor(s) and storage media (e.g., memory, magnetic, storage, optical storage, etc.). Such elements may be employed to provide various user applications. For instance, the storage media may store instructions (e.g., control logic or software) that causes the processors to execute such applications. Further, the storage media may store data that is handled by such applications. Such user applications may involve information exchanged through coil structures 1506 and 1510 (e.g., through NFC applications). Accordingly, the processors may each be operatively coupled to a corresponding one of modules 1508 and 1512.

Further, such user applications may involve the exchange of information with users. Accordingly, devices 1502 and 1504 may include various user input and output devices. Examples of such devices include (but are not limited to) keypads, keyboards, touch screens, microphones, speakers, displays, etc.

Devices 1502 and 1504 may be of various types. For example, devices 1502 and 1504 may be any combination of a notebook computer, desktop computer, tablet computer, personal assistant (PDA), mobile phone, smartphone, media player, and so forth. In exemplary wireless charging and/or power (e.g., operational power) transfer scenarios, the larger device may transmit energy to the smaller, device (e.g., a notebook may wirelessly charge a mobile phone or smartphone). Such a scenario is provided for purposes of illustration and not limitation. Thus, a smaller device may wirelessly charge a larger device.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation. For instance, although partial torus coil structures that are arranged along an arc have been described, embodiments may employ coil structures of other shapes. For example, in embodiments coil structures may be arranged along segments other than arcs (e.g., curves that are not segments of a circle).

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. An apparatus, comprising:
   a casing comprising a first surface and a second surface, the first surface substantially perpendicular to the second surface;
   a coil disposed within the casing, the coil having a plurality of turns arranged along an arc that spans a partial torus;
   wherein the coil has a first end and a second end, the first and second ends substantially normal to at least a portion of the arc, the first end further substantially parallel with the first surface and the second end substantially parallel with the second surface; and
   a module to exchange an electrical signal with the coil.

2. The apparatus of claim 1, wherein the arc has an angle of approximately π/2.

3. The apparatus of claim 1, wherein each of the plurality of turns has a circular shape.

4. The apparatus of claim 1, wherein each of the plurality of turns has a rectangular shape.

5. The apparatus of claim 1, wherein each of the plurality of turns has a racetrack shape.

6. The apparatus of claim 1, wherein the module is to send the electrical signal to the coil.

7. The apparatus of claim 1, wherein the module is to receive the electrical signal from the coil.

8. The apparatus of claim 7, further comprising a battery; wherein the electrical signal is to charge the battery.

9. The apparatus of claim 7, wherein the electrical signal is to power a load.

10. The apparatus of claim 1, wherein the coil is to generate a wireless signal based on the electrical signal.

11. The apparatus of claim 10, wherein the wireless signal conveys information.

12. The apparatus of claim 11, wherein the wireless signal is intended for reception by a near field communication (NFC) device.

13. The apparatus of claim 1, wherein the electrical signal is based on a wireless signal received by the coil.

14. The apparatus of claim 1, wherein the electrical signal is a wireless power transfer (WPT) signal.

15. The apparatus of claim 1, wherein the electrical signal is a near field communication (NFC) signal.

16. The apparatus of claim 1, wherein the apparatus is a notebook computing platform.

17. The apparatus of claim 1, wherein the apparatus is a tablet computing platform.

18. The apparatus of claim 1, wherein the apparatus is a smartphone.

19. An apparatus, comprising:
   a casing having a first surface and a second surface non-parallel with the first surface;
   a coil having a plurality of turns arranged along an arc that spans a partial torus, the coil having a first end and a second end, the first end facing the first surface and the second end facing the second surface; and
   a module to exchange an electrical signal with the coil.

20. The apparatus of claim 19, wherein the module is to send the electrical signal to the coil.

21. The apparatus of claim 20, wherein the coil is to generate a wireless signal based on the electrical signal.

22. The apparatus of claim 19, wherein the module is to receive the electrical signal from the coil.

23. The apparatus of claim 22, wherein the coil is to receive a wireless signal, wherein the electrical signal is based on the wireless signal.

24. The apparatus of claim 22, further comprising a battery; wherein the electrical signal is to charge the battery.

25. The apparatus of claim 22, wherein the electrical signal is to power a load.

26. The apparatus of claim 19, wherein the electrical signal is a wireless power transfer (WPT) signal.

27. The apparatus of claim 19, wherein the electrical signal is a near field communication (NFC) signal.

* * * * *